United States Patent
Lu

(10) Patent No.: US 10,950,272 B2
(45) Date of Patent: Mar. 16, 2021

(54) METHOD AND APPARATUS FOR OBTAINING AUDIO-VISUAL INFORMATION, DEVICE, AND STORAGE MEDIUM

(71) Applicant: BEIJING XIAOMI MOBILE SOFTWARE CO., LTD., Beijing (CN)

(72) Inventor: Xiaochuang Lu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/699,565

(22) Filed: Nov. 30, 2019

(65) Prior Publication Data
US 2021/0020200 A1    Jan. 21, 2021

(30) Foreign Application Priority Data

Jul. 15, 2019  (CN) .......................... 201910637586.5

(51) Int. Cl.
*H04N 9/80* (2006.01)
*G11B 27/031* (2006.01)
(Continued)

(52) U.S. Cl.
CPC .......... *G11B 27/031* (2013.01); *G10L 17/00* (2013.01); *G10L 25/57* (2013.01); *G11B 27/19* (2013.01); *H04N 5/2624* (2013.01)

(58) Field of Classification Search
CPC .... G11B 27/031; G11B 27/19; H04N 5/2624; G10L 25/57; G10L 17/00
(Continued)

(56) References Cited

U.S. PATENT DOCUMENTS

| | | | |
|---|---|---|---|
| 10,186,075 B2* | 1/2019 | Foutzitzis | ............... G06T 15/04 |
| 2013/0195428 A1* | 8/2013 | Marks | ................ G11B 27/036 |
| | | | 386/278 |

(Continued)

FOREIGN PATENT DOCUMENTS

| | | |
|---|---|---|
| CN | 108346034 A | 7/2018 |
| JP | 2004023661 A | 1/2004 |
| WO | 2014173370 A1 | 10/2014 |

OTHER PUBLICATIONS

Extended European Search Report of European Application No. 20151681.2 dated Apr. 14, 2020.

(Continued)

*Primary Examiner* — Robert Chevalier
(74) *Attorney, Agent, or Firm* — Syncoda LLC; Feng Ma

(57) ABSTRACT

A method for obtaining audio-visual information includes: obtaining original video information and original audio information corresponding to respective speakers during a conversation; extracting a video frame sequence of a speaker who is speaking in each of the original video information based on the original audio information; stitching each of the extracted video frame sequences in a chronological order to obtain stitched video information; and matching the stitched video information with the original audio information to obtain the audio-visual information. The obtained stitched video information can be made to include a video frame sequence corresponding to each of speakers who are speaking, automatic editing of the original video information during a multi-speaker conversation can be realized, requirement for the user's capability to obtain audio-visual information is lowered, and intelligent level of audio-visual information acquisition is improved, thereby user experience is improved.

20 Claims, 10 Drawing Sheets

(51) Int. Cl.
  *H04N 5/262*   (2006.01)
  *G11B 27/19*   (2006.01)
  *G10L 25/57*   (2013.01)
  *G10L 17/00*   (2013.01)
  *H04N 5/93*    (2006.01)

(58) Field of Classification Search
  USPC .................. 386/241, 239, 278, 281, 285
  See application file for complete search history.

(56) References Cited

U.S. PATENT DOCUMENTS

2017/0287481 A1* 10/2017 Bhat .................. G10L 25/81
2018/0174600 A1   6/2018 Chaudhuri et al.
2019/0115029 A1   4/2019 Kracun et al.

OTHER PUBLICATIONS

Joon Son Chuang et al: "Who said that?: Audio-visual speaker diarisation of real-world meetings", arxiv.org, Cornell University Library, 201 Olin Library Cornell University Ithaca, NY 14853, Jun. 24, 2019.

* cited by examiner

METHOD AND APPARATUS FOR OBTAINING AUDIO-VISUAL INFORMATION, DEVICE, AND STORAGE MEDIUM

CROSS-REFERENCE TO RELATED APPLICATION

This application claims priority to Chinese Patent Application 201910637586.5 filed on Jul. 15, 2019, the disclosure of which is hereby incorporated by reference in its entirety.

BACKGROUND

When capturing a video of a multi-person conversation, it is usually necessary to set up a plurality of camera devices to simultaneously capture the speakers, and then after the video capturing is completed, video clips of respective speaker are put together by means of post-editing, thus achieving the video effect of back-and-forth conversations among the speakers.

SUMMARY

The present disclosure relates generally to the field of video processing technologies, and more specifically to a method and apparatus for obtaining audio-visual information.

According to a first aspect of embodiments of the present disclosure, there is provided a method for obtaining audio-visual information, the method including:

obtaining original video information and original audio information corresponding to respective persons during a conversation;

extracting, based on the original audio information, a video frame sequence of a person who is speaking in each of the original video information;

stitching each of the extracted video frame sequences in a chronological order to obtain stitched video information; and matching the stitched video information with the original audio information to obtain the audio-visual information.

In an embodiment, said extracting, based on the original audio information, a video frame sequence of a person who is speaking in each of the original video information includes:

determining an audio segment of the person who is speaking in the original audio information; and extracting a video frame sequence corresponding to the audio segment in each of the original video information.

In an embodiment, said determining an audio segment of the person who is speaking in the original audio information includes:

performing voiceprint recognition on the original audio information to obtain a voiceprint feature of the person who is speaking; and screening, based on the voiceprint feature, the audio segment of the person who is speaking from the original audio information.

In an embodiment, the method further includes:

determining an audio utterance start point of the person who is speaking in the audio segment; and rectifying, based on the audio utterance start point, the stitched video information.

In an embodiment, said obtaining original video information corresponding to respective persons during a conversation includes:

obtaining a plurality of original video information collected simultaneously by a plurality of image collection devices during the conversation made by the respective persons.

In an embodiment, the method further includes:

when the person is speaking, displaying a video image of the person who is speaking in a first preset display area on a terminal screen, and displaying a video image of other persons in a second preset area on the terminal screen, said other persons including persons other than the person who is speaking among the respective persons.

In an embodiment, said displaying a video image of the person who is speaking in a first preset display area on a terminal screen includes:

determining the number of the person who is speaking; and if the number is greater than or equal to 2, displaying video images of all the persons who are speaking in a split-screen manner in the first preset display area on the terminal screen.

In an embodiment, the method further includes:

if it is detected that a sound intensity of the person who is speaking is higher than or equal to a preset threshold, generating prompt information for prompting to reduce the sound intensity.

According to a second aspect of embodiments of the present disclosure, there is provided a n apparatus for obtaining audio-visual information, the apparatus including:

a video and audio obtaining circuit configured to obtain original video information and original audio information corresponding to respective persons during a conversation;

a frame sequence extracting circuit configured to extract, based on the original audio information, a video frame sequence of a person who is speaking in each of the original video information;

a frame sequence stitching circuit configured to stitch each of the extracted video frame sequences in a chronological order to obtain stitched video information; and an audio-visual information obtaining circuit configured to match the stitched video information with the original audio information to obtain the audio-visual information.

In an embodiment, the frame sequence extracting circuit includes:

an audio segment obtaining unit configured to determine an audio segment of the person who is speaking in the original audio information; and a frame sequence extracting unit configured to extract a video frame sequence corresponding to the audio segment in each of the original video information.

In an embodiment, the audio segment obtaining unit is further configured to:

perform voiceprint recognition on the original audio information to obtain a voiceprint feature of the person who is speaking; and screen, based on the voiceprint feature, the audio segment of the person who is speaking from the original audio information.

In an embodiment, the apparatus further includes a video information rectifying circuit; the video information rectifying circuit includes:

an audio utterance start point determining unit configured to determine an audio utterance start point of the person who is speaking in the audio segment; and a video information rectifying unit configured to rectify, based on the audio utterance start point, the stitched video information.

In an embodiment, the video and audio obtaining circuit is further configured to obtain a plurality of original video information collected simultaneously by a plurality of image collection devices during the conversation made by the respective persons.

In an embodiment, the apparatus further includes:

a video image displaying circuit configured to display, when the person is speaking, a video image of the person who is speaking in a first preset display area on a terminal screen, and display a video image of other persons in a second preset area on the terminal screen, said other persons including persons other than the person who is speaking among the respective persons.

In an embodiment, the video image displaying circuit includes:

a person quantity determining unit configured to determine the number of the person who is speaking; and a video image displaying unit configured to display, if the number is greater than or equal to 2, video images of all the persons who are speaking in a split-screen manner in the first preset display area on the terminal screen.

In an embodiment, the apparatus further includes:

a prompt information generating circuit configured to generate prompt information for prompting to reduce the sound intensity if it is detected that a sound intensity of the person who is speaking is higher than or equal to a preset threshold.

According to a third aspect of embodiments of the present disclosure, there is provided an audio-visual information obtaining device, including: a memory, a processor, and a computer program stored on the memory and operable on the processor, wherein the following is implemented when the processor executes the program:

obtaining original video information and original audio information corresponding to respective persons during a conversation;

extracting, based on the original audio information, a video frame sequence of a person who is speaking in each of the original video information;

stitching each of the extracted video frame sequences in a chronological order to obtain stitched video information; and matching the stitched video information with the original audio information to obtain the audio-visual information.

According to a fourth aspect of embodiments of the present disclosure, there is provided a computer-readable storage medium having stored thereon a computer program, wherein the following is implemented when the program is implemented by a processor:

obtaining original video information and original audio information corresponding to respective persons during a conversation;

extracting, based on the original audio information, a video frame sequence of a person who is speaking in each of the original video information;

stitching each of the extracted video frame sequences in a chronological order to obtain stitched video information;

matching the stitched video information with the original audio information to obtain the audio-visual information.

It is to be understood that both the foregoing general description and the following detailed description are exemplary and explanatory only and are not limiting of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with some aspects related to the disclosure as recited in the appended claims.

It should be understood that although the terms "first," "second," "third," etc. may be used in the present disclosure to describe various information, such information should not be limited to these terms. These terms are only used to distinguish the same type of information from each other.

For example, without departing from the scope of the present disclosure, the first information may also be referred to as the second information, and similarly, the second information may also be referred to as the first information. Depending on the context, the word "if" as used herein may be interpreted as "at the time . . . " or "when" or "in response to a determination."

Various embodiments of the present disclosure can address some needs of non-professional users, for whom post-editing might be difficult.

Figure 1:
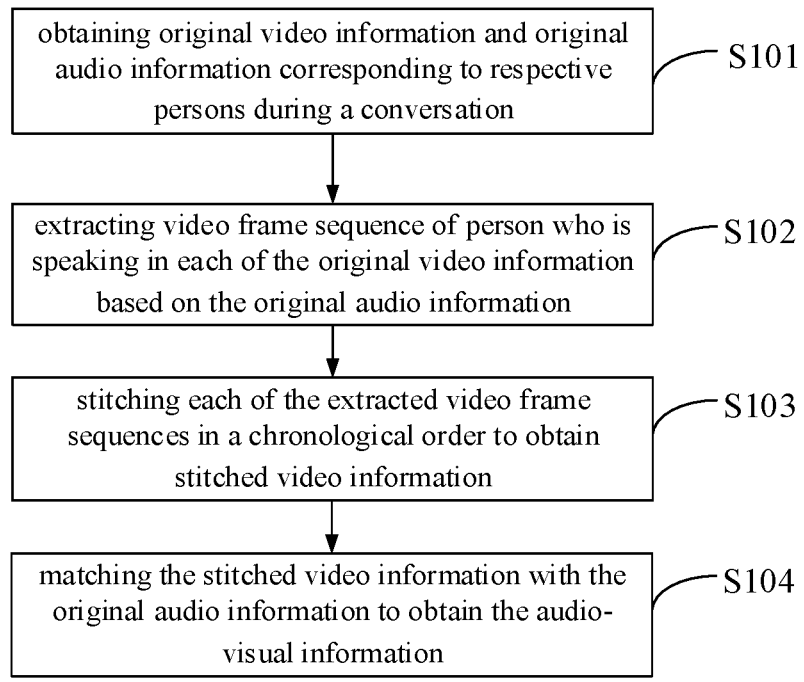
FIG. 1 is a flowchart of a method for obtaining audio-visual information according to a first exemplary embodiment of the present disclosure.

FIG. 1 is a flowchart of a method for obtaining audio-visual information according to a first exemplary embodiment of the present disclosure; this embodiment may be applied to a terminal device (such as a smart phone, a tablet computer, a desktop computer, and an identity information handheld terminal, etc.). As shown in FIG. 1, the method includes the following steps S101-S103.

In step S101, original video information and original audio information corresponding to respective persons during a conversation are obtained.

In an embodiment, in order to capture target video information during a multi-person conversation, the original video information and the original audio information corresponding to each of the plurality of persons having the current conversation may be obtained.

Herein, the target video information includes a video frame sequence corresponding to each person who is speaking among the respective persons.

In an embodiment, each of the original video information may include video information of at least one person during the conversation, which is not limited in this embodiment.

Figure 5A:
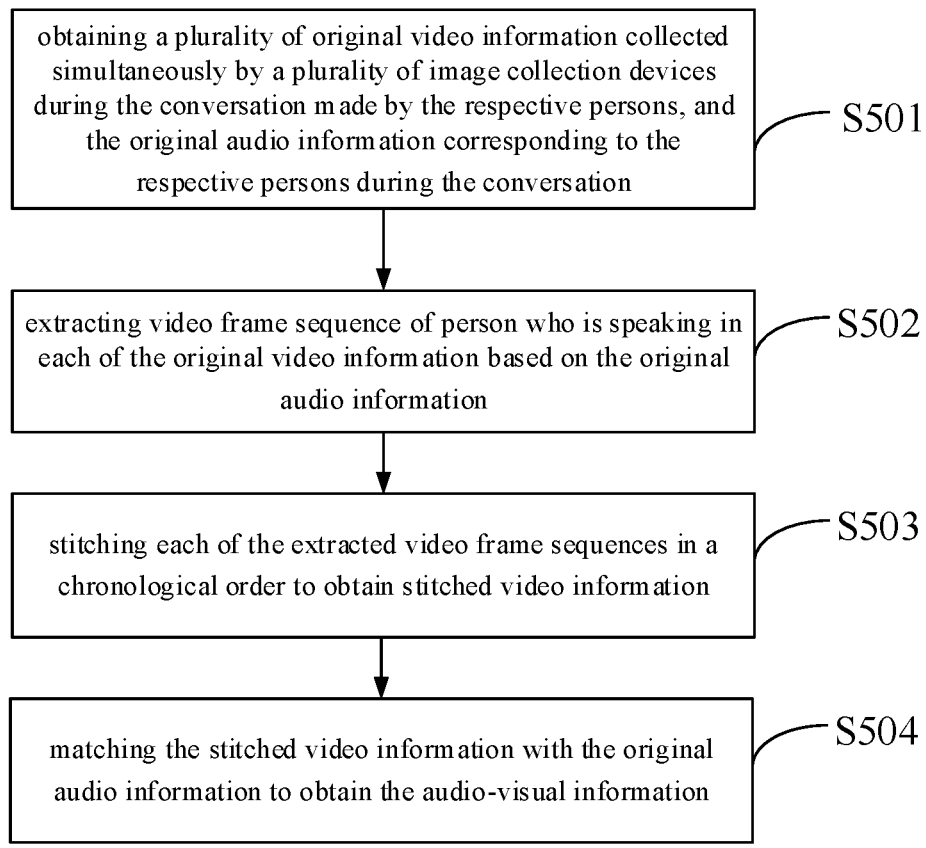
FIG. 5A is a flowchart of a method for obtaining audio-visual information according to a third exemplary embodiment of the present disclosure.

In an embodiment, as for the manner of obtaining the original video information corresponding to the respective persons in the conversation, reference may be made to the following embodiment shown in FIG. 5A, and details are not described herein.

In an embodiment, the original audio information may include audio information of at least one person during the conversation, which is not limited in this embodiment.

In an embodiment, the original audio information may be collected by a sound collection device (e.g., a microphone) provided in a terminal device associated with the at least one person.

In step S102, a video frame sequence of a person who is speaking in each of the original video information is extracted based on the original audio information.

In an embodiment, after the original video information and the original audio information corresponding to the respective persons during the conversation are obtained, the video frame sequence of the person who is speaking in each of the original video information may be extracted based on the original audio information. Herein, the video frame sequence may include multiple frames of the video image of the speaker, which is not limited in this embodiment.

In an embodiment, the at least one person in the original video information is not always speaking during the conversation, thus each of the original video information may include a video frame sequence when the at least one person is speaking and a video frame sequence when the at least one person is not speaking.

For example, when the person A in the original video information a is speaking, the person B in the original video information b is not speaking; otherwise, when the person A in the original video information a has finished speaking and the person B in the original video information b turns to speak, the person A in the original video information a is not speaking. Thus, the original video information a (or b) contains a video frame sequence when the person A (or B) is speaking and a video frame sequence when said person is not speaking.

In an embodiment, for the manner of extracting the video frame sequence of the person who is speaking in each of the original video information based on the original audio information, reference may be made to the embodiment shown in FIG. 2 below, and details are not described herein.

In step S103, the each of the extracted video frame sequences are stitched in a chronological order to obtain stitched video information.

In an embodiment, after the video frame sequence of the person who is speaking in each of the original video information is extracted based on the original audio information, the extracted respective video frame sequences can be stitched in a chronological order to obtain stitched video information.

In an embodiment, after the video frame sequence of the person who is speaking in each of the original video information is extracted based on the original audio information, the shooting time of each video frame sequence may be determined, and then the video frame sequences can be stitched in accordance with the sequence of the shooting time, to obtain the stitched video information (i.e., the target video information).

In an embodiment, the respective video frame sequences of the stitched video information may be switched by using an alpha cross-dissolve technique, and may be also directly switched, which is not limited in this embodiment.

It is to be noted that for the manner in which the each of the extracted video frame sequences are stitched in a chronological order, reference may be made to the explanation and description in the prior art, which is not limited in this embodiment.

In step S104, the stitched video information is matched with the original audio information to obtain the audio-visual information.

In an embodiment, after each of the extracted video frame sequences are stitched in a chronological order to obtain the stitched video information, the stitched video information may be matched with the original audio information to obtain matched audio-visual information.

It is to be noted that for the manner in which the stitched video information is matched with the original audio information, for example, the stitched video information may be matched with the original audio information based on a time axis, reference may be made to the prior art, which is not limited in this embodiment.

As can be known from the above description, in this embodiment, by obtaining the original video information and the original audio information corresponding to the respective persons during a conversation, and extracting a video frame sequence of a person who is speaking in each of the original video information based on the original audio information, each of the extracted video frame sequences can be stitched in a chronological order to obtain stitched video information, so as to match the stitched video information with the original audio information, and thus the audio-visual information is obtained. Since the video frame sequence of the person who is speaking in each of the original video information is extracted and then the respective video frame sequences are stitched in a chronological order, the obtained stitched video information can be made to include a video frame sequence corresponding to each person who is speaking, automatic editing of the original video information during a multi-person conversation is realized, requirement for the user's capability to obtain audio-visual information is lowered, and an intelligent level of audio-visual information acquisition is improved, thereby user experience is improved.

Figure 2:
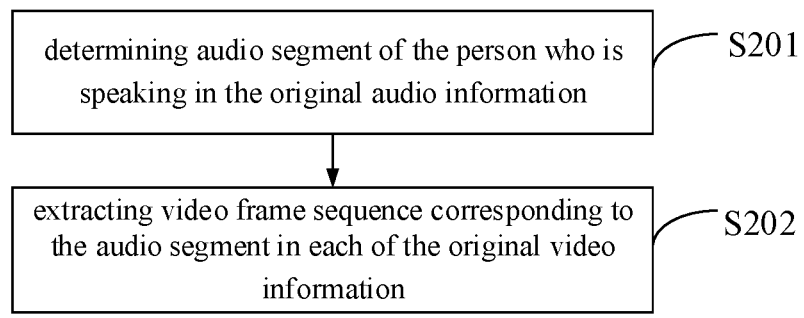
FIG. 2 is a flowchart showing how to extract a video frame sequence of a person who is speaking in each of the original video information according to an exemplary embodiment of the present disclosure.

FIG. 2 is a flowchart showing how to extract a video frame sequence of a person who is speaking in each of the original video information according to an exemplary embodiment of the present disclosure; on the basis of the foregoing embodiment, this embodiment makes illustration by taking how to extract a video frame sequence of the person who is speaking in each of the original video information based on the original audio information as an example, and as shown in FIG. 2, the process that a video frame sequence of a current speaker in each of the original video information is extracted based on the original audio information in step S102 may include the following steps S201-S202.

In step S201, an audio segment of the person who is speaking in the original audio information is determined.

In an embodiment, at least one person in the original audio information is not always speaking during the conversation, and thus the original audio information may include an audio segment when the at least one person is speaking and an audio segment when the at least one person is not speaking.

For example, when the person A in the original audio information aa is speaking, the person B in the original audio information bb is not speaking; otherwise, when the person A in the original audio information aa finishes speaking, and then the person B in the original audio information bb turns to speaking, the person A in the original audio information aa is not speaking. Thus, the original audio information aa (or bb) contains an audio segment when the person A (or B) is speaking and an audio segment when the person A (or B) is not speaking.

In an embodiment, the embodiment shown in FIG. 3 below may be referenced for the manner of determining the audio segment of the person who is speaking in the original audio information, details are not described herein.

In step S202, a video frame sequence corresponding to the audio segment in each of the original video information is extracted.

In an embodiment, after determining the audio segment of the person who is speaking in the original audio information, a video frame sequence corresponding to the audio segment in each of the original video information may be extracted.

In an embodiment, the original audio information and the original video information of the above-mentioned person who is speaking can be collected by the sound collection device and the image collection device of the same terminal device, thus the video frame sequence corresponding to the audio segment in each original video information can be extracted based on the source of the original audio information and the original video information. For example, the original video information having the same source as the original audio information to which the audio segment belongs may be determined, thereby a video frame sequence corresponding to the audio segment may be extracted from the original video information.

It should be noted that, in addition to the above-mentioned manner of extracting the video frame sequence corresponding to the audio segment in each original video information based on the source of the original audio information and the original video information, other manners in the prior art may be also selected based on practical needs to extract the video frame sequence of the person who is speaking, an obtained result is also applicable to the subsequent steps, which is limited in this embodiment.

As can be known from the above description, in this embodiment, by obtaining the original audio information corresponding to the respective persons during the conversation, and determining the audio segment of the person who is speaking in the original audio information, a video frame sequence corresponding to the audio segment in each of the original video information is extracted, which can implement extraction of the video frame sequence of the person who is speaking in each of the original video information based on the original audio information. Because a video frame sequence of the person who is speaking in each of the original video information is extracted corresponding to the audio segment of the person who is speaking, based on the original audio information, the accuracy of extracting the video frame sequence of the person who is speaking is improved, and then the accuracy of the subsequent stitching of the video information based on the extracted video frame sequence can be improved.

Figure 3:
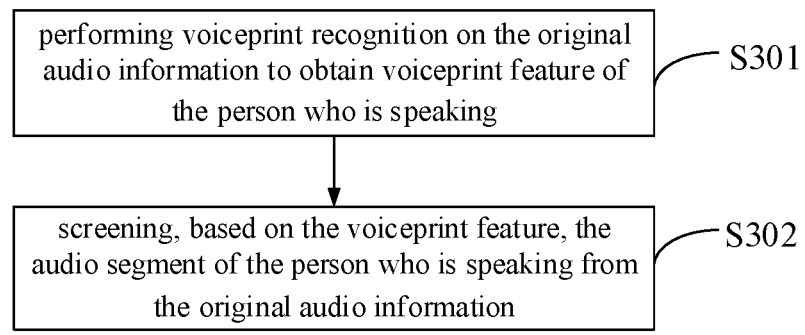
FIG. 3 is a flowchart showing how to determine an audio segment of the person who is speaking in the original audio information according to an exemplary embodiment of the present disclosure.

FIG. 3 is a flowchart showing how to determine an audio segment of the person who is speaking in the original audio information according to an exemplary embodiment of the present disclosure; on the basis of the foregoing embodiment, this embodiment makes illustration by taking how to determine an audio segment of the person who is speaking in the original audio information as an example. As shown in FIG. 3, the process that an audio segment of the person who is speaking in the original audio information is determined in step S201 may include the following steps S301-S302.

In step S301, voiceprint recognition is performed on the original audio information to obtain a voiceprint feature of the person who is speaking.

In an embodiment, after the original audio information corresponding to the respective persons in the conversation is obtained, voiceprint recognition may be performed on the original audio information to obtain a voiceprint feature of the person who is speaking.

It can be understood that, since the original audio information includes an audio segment when at least one person is speaking and an audio segment when the at least one person is not speaking, the voiceprint feature of the person who is speaking can be detected in the audio segment when the speaker is speaking, whereas the voiceprint feature of the person who is speaking cannot be detected in the audio segment when the speaker is not speaking.

It is to be noted that for the manner of performing voiceprint recognition on the original audio information and obtaining the voiceprint feature of the person who is speaking, reference may be made to the explanation and description in the prior art, which is not limited in this embodiment.

In step S302, based on the voiceprint feature, the audio segment of the person who is speaking is screened from the original audio information.

In an embodiment, after voiceprint recognition is performed on the original audio information to obtain the voiceprint feature of the person who is speaking, the audio segment of the person who is speaking may be screened from the original audio information based on the voiceprint feature.

For example, after the voiceprint feature of the person who is speaking is obtained, the audio segment including the voiceprint feature may be determined as an audio segment of the person who is speaking, and then the audio segment of the person who is speaking may be screened from the original audio information.

As can be known from the above description, in this embodiment, the voiceprint feature of the person who is speaking is obtained by performing voiceprint recognition on the original audio information, and the audio segment of the person who is speaking is screened from the original audio information based on the voiceprint feature, which can implement screening of the audio segment of the person who is speaking from the original audio information based on the voiceprint feature of the person who is speaking, thereby the accuracy of screening the audio segment of the person who is speaking can be improved, and thus the accuracy of extracting the video frame sequence of the person who is speaking based on the audio segment subsequently can be future improved.

Figure 4:
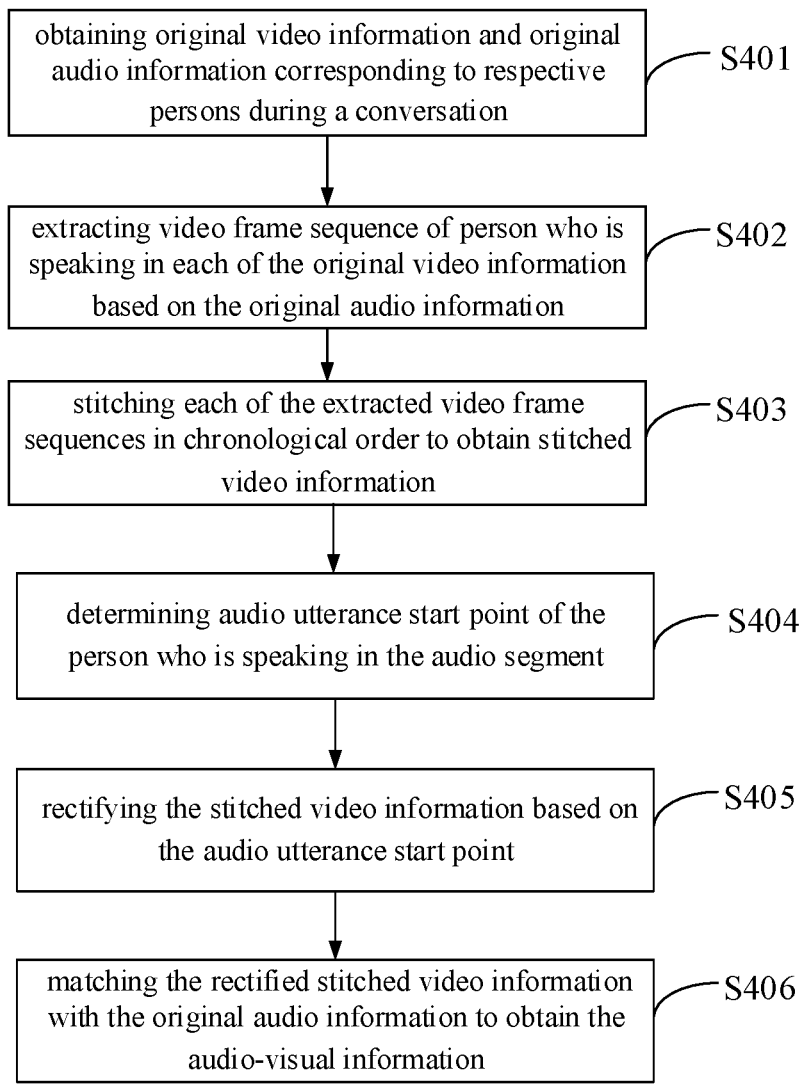
FIG. 4 is a flowchart of a method for obtaining audio-visual information according to a second exemplary embodiment of the present disclosure.

FIG. 4 is a flowchart of a method for obtaining audio-visual information according to a second exemplary embodiment of the present disclosure; this embodiment can be applied to a terminal device (such as a smart phone, a tablet computer, a desktop computer, and an identity information handheld terminal, etc.). As shown in FIG. 4, the method includes the following steps S401-S405.

In step S401, original video information and original audio information corresponding to respective persons during a conversation are obtained.

In step S402, a video frame sequence of a person who is speaking in each of the original video information is extracted based on the original audio information.

In step S403, each of the extracted video frame sequences are stitched in a chronological order to obtain stitched video information.

In step S404, an audio utterance start point of the person who is speaking in the audio segment is determined.

It can be understood that, due to the performance of the terminal device and the influence of the sound detection algorithm, an obtained video picture of the stitched video information may not completely match the audio information, and thus the stitched video information needs to be rectified.

In an embodiment, in order to rectify the obtained stitched video information, after the stitched video information is obtained, an audio utterance start point of the person who is speaking is determined from the audio segment of the person who is speaking.

It should be noted that the manner of determining the audio utterance start point of the person who is speaking from the audio segment of the person who is speaking as described above may be selected by the developer from the prior art according to actual business needs, for example, based on voice recognition technique, a position of the first word in the audio segment may be determined as the utterance start point of the person who is speaking, which is not limited in this embodiment.

In step S405, the stitched video information is rectified based on the audio utterance start point.

In an embodiment, after the audio utterance start point of the person who is speaking in the audio segment is determined, the stitched video information may be rectified based on the audio utterance start point to obtain rectified stitched video information.

For example, after determining the audio utterance start point of the person A in the audio segment aa_1, a start video frame corresponding to the audio utterance start point in the original video information a may be extracted based on the audio utterance start point, and then the video frame sequence of the person A is re-extracted from the original video information a based on the start video frame, so as to achieve the purpose of rectifying the video frame sequence of the person A in the stitched video information. Similarly, the video frame sequences of the respective other persons in the stitched video information can be rectified to obtain the rectified stitched video information.

In step S406, the rectified stitched video information is matched with the original audio information to obtain the audio-visual information.

Herein, as for the related explanations and descriptions of steps S401-S403 and S406, reference may be made to the foregoing embodiments, and details are not described herein.

As can be known from the above description, by determining the audio utterance start point of the person who is speaking in the audio segment, and then rectifying the stitched video information based on the audio utterance start point, rectification of the stitched video information obtained by stitching the respective video frame sequences can be implemented based on the audio utterance start point of the person who is speaking, the accuracy of the stitched video information can be improved, and the user's needs can be met.

FIG. 5A is a flowchart of a method for obtaining audio-visual information according to a third exemplary embodiment of the present disclosure; this embodiment can be applied to a terminal device (such as a smart phone, a tablet computer, a desktop computer, and an identity information handheld terminal, etc.). As shown in FIG. 5A, the method includes the following steps S501-S503.

In step S501, a plurality of original video information collected simultaneously by a plurality of image collection devices during the conversation made by the respective persons are obtained, and the original audio information corresponding to the respective persons during the conversation is obtained.

In an embodiment, in order to capture target video information during a multi-person conversation, the original video information of each person during the conversation may be simultaneously collected by a plurality of image collection devices.

In an embodiment, each of the image collection devices may be disposed in front of each person to collect the original video information of the person during the conversation.

Figure 5B:
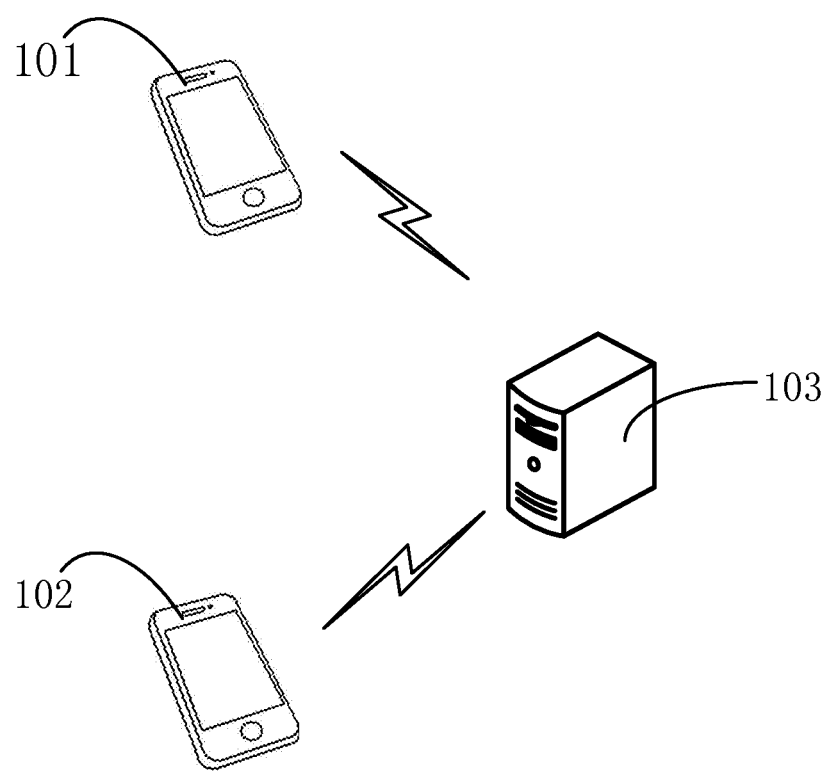
FIG. 5B is a schematic diagram of an application scenario of the method for obtaining audio-visual information according to an embodiment of the present disclosure.

In an embodiment, FIG. 5B is a schematic diagram of an application scenario of the method for obtaining audio-visual information according to an embodiment of the present disclosure. As shown in FIG. 5B, the plurality of image collection devices may be image collection devices of a plurality of terminal devices (e.g., smart phone 101 and smart phone 102). Herein, a wireless communication connection may be established in advance between the smart phone 101 and the smart phone 102, and the original video information collected by each of the devices may be aggregated to the smart phone 101 and/or the smart phone 102 based on the communication connection, so as to implement the above method for obtaining audio-visual information by the device(s) to which all information is aggregated. Alternatively, the original video information collected by the smart phone 101 and the smart phone 102 respectively may be aggregated into a server 103, so as to implement the above-described method for obtaining audio-visual information by the server 103, which is not limited in this embodiment.

In another embodiment, the plurality of image collection devices may be different image collection devices on the same terminal device, for example, may be front and rear cameras on the same smart phone, which is not limited in this embodiment.

It can be understood that the original video information being collected by the different image collection devices on the same terminal device during the above conversation can reduce the number of devices that collect the original video information, thereby reducing device cost of collecting the original video information.

In step S502, a video frame sequence of a person who is speaking in each of the original video information is extracted based on the original audio information.

In step S503, each of the extracted video frame sequences are stitched in a chronological order to obtain stitched video information.

In step S504, the stitched video information is matched with the original audio information to obtain the audio-visual information.

Herein, as for the related explanations and descriptions of steps S502-S504, reference may be made to the foregoing embodiments, and details are not described herein.

As can be known from the above description, in this embodiment, by obtaining a plurality of original video information that are collected by a plurality of image collection devices during the conversation made by multiple persons, the subsequent processes of obtaining of the video frame sequence of the person who is speaking based on the obtained original video information, and stitching of the extracted video frame sequences to obtain the stitched video information can be implemented, the flexibility of obtaining the original video information can be improved, and the equipment cost of collecting the original video information can be reduced, thereby user's needs can be satisfied.

Figure 6A:
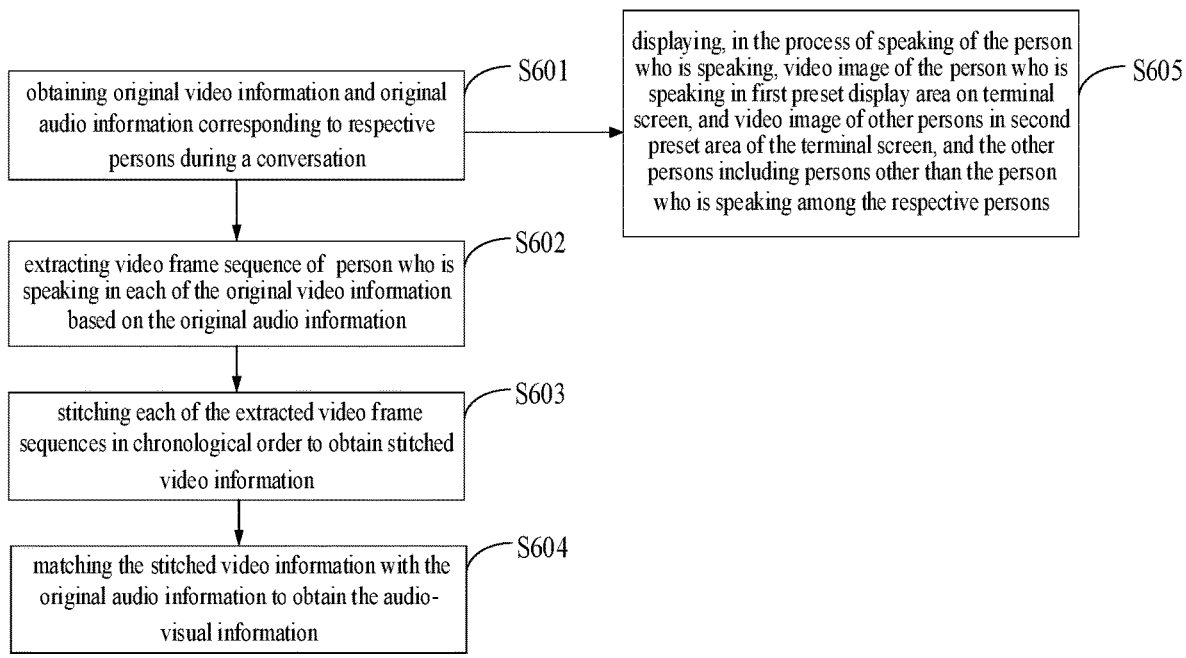
FIG. 6A is a flowchart of a method for obtaining audio-visual information according to a fourth exemplary embodiment of the present disclosure.

FIG. 6A is a flowchart of a method for obtaining audio-visual information according to a fourth exemplary embodiment of the present disclosure; this embodiment can be applied to a terminal device (such as a smart phone, a tablet computer, a desktop computer, and an identity information handheld terminal, etc.). As shown in FIG. 6A, the method includes the following steps S601-S604.

In step S601, original video information and original audio information corresponding to respective persons during a conversation are obtained.

In step S602, a video frame sequence of a person who is speaking in each of the original video information is extracted based on the original audio information.

In step S603, each of the extracted video frame sequences are stitched in a chronological order to obtain stitched video information.

In step S604, the stitched video information is matched with the original audio information to obtain the audio-visual information.

As for the related explanations and descriptions of steps S601-S604, reference may be made to the foregoing embodiments, and details are not described herein.

In step S605, in the process of speaking of the person who is speaking, a video image of the person who is speaking is displayed in a first preset display area on a terminal screen, and a video image of other persons is displayed in a second preset area of the terminal screen, and the other persons include persons other than the person who is speaking among the respective persons.

Figure 6B:
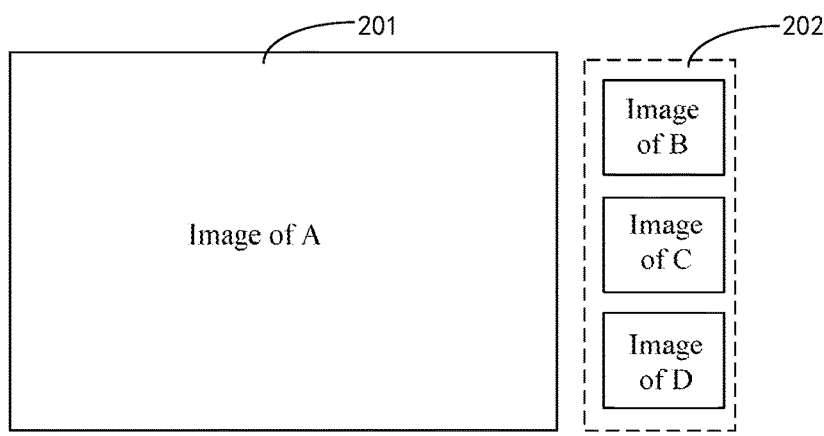
FIG. 6B is a schematic diagram showing the video information displaying effect according to an embodiment of the present disclosure.

For example, FIG. 6B is a schematic diagram showing the video information displaying effect according to an embodiment of the present disclosure. As shown in FIG. 6B, when the person is speaking A, the picture of the person who is speaking A can be displayed in the first preset display area 201 on the terminal screen, and the pictures of the person B, the person C and the person D can be displayed in a second preset display area 202 on the terminal screen, wherein the person A is currently speaking, and thus the corresponding first preset display area 201 is relatively large; and the person B, the person C, and the person D are not currently speaking, and thus the second preset display area 202 corresponding thereto is relatively small, so that the purpose of highlighting the person who is speaking A and enhancing the video information displaying effect can be achieved.

In an embodiment, the terminal device may include at least one of the terminal devices of the person A, the person B, the person C, and the person D, which is not limited in this embodiment.

As can be known from the above description, when the person is speaking, the video image of the person who is speaking is displayed in the first preset display area on the terminal screen, and the video image of other persons is displayed in the second preset display area on the terminal screen, it can be realized that the person who is speaking and the other persons who are not speaking can be displayed in different preset display areas on the terminal screen, and the purpose of highlighting the person who is speaking and enhancing the video information displaying effect can be achieved.

Figure 7A:
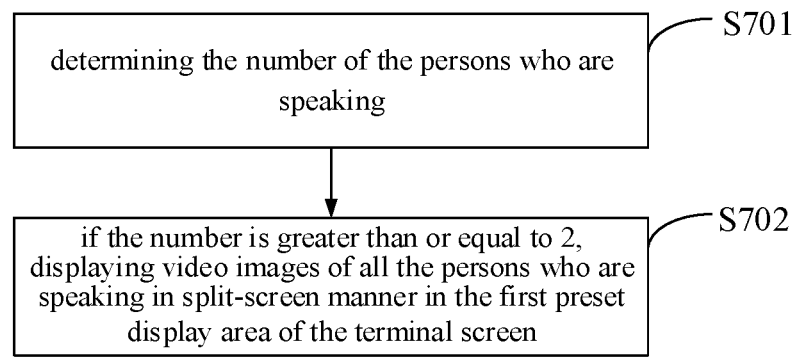
FIG. 7A is a flowchart showing how a video image of a person who is speaking is displayed in a first preset display area on a terminal screen according to an exemplary embodiment of the present disclosure.

FIG. 7A is a flowchart showing how a video image of a person who is speaking is displayed in a first preset display area on a terminal screen according to an exemplary embodiment of the present disclosure; on the basis of the foregoing embodiment, this embodiment makes illustration by taking how to display a video image of the person who is speaking in a first preset display area on a terminal screen as an example. As shown in FIG. 7A, the process that the video image of the person who is speaking is displayed in a first preset display area on a terminal screen in step S605 may include the following steps S701-S702, and may include the following steps S701-S702.

In step S701, the number of the persons who are speaking is determined.

In an embodiment, when the person is speaking, the number of the person who is speaking may be determined.

In an embodiment, the number of the persons who are speaking at a moment can be determined by counting the number of audio segments corresponding to the persons who are speaking at the same moment. For example, if it is counted that the number of audio segments corresponding to the persons who are speaking at a certain moment is n, it can be determined that the number of the persons who are speaking at the moment is n, where n is a positive integer.

In step S702, if the number is greater than or equal to 2, video images of all the persons who are speaking are displayed in a split-screen manner in the first preset display area of the terminal screen.

In an embodiment, after determining the number of the persons who are speaking, it can be determined whether the number is greater than or equal to 2, and if it is yes, the video images of the persons who are speaking can be all displayed on the terminal screen in a split-screen manner in the first preset display area.

Figure 7B:
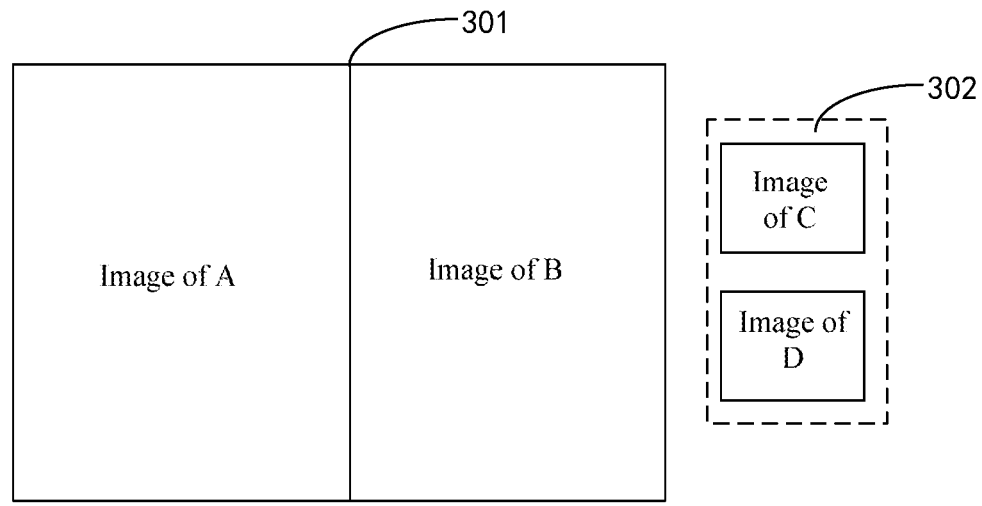
FIG. 7B is a schematic diagram showing the video information displaying effect according to an embodiment of the present disclosure.

For example, FIG. 7B is a schematic diagram showing the video information displaying effect according to an embodiment of the present disclosure. As shown in FIG. 7B, if it is determined that the person who is speaking is the person A and the person B, it can be determined that the number of the persons who are speaking is 2, and then the pictures of the person A and the person B who are speaking can be both displayed in the first preset display area 301 in a split-screen manner, and the pictures of the person C and the person D who are not speaking are displayed in the second preset display area 302.

Further, when the person B is not speaking, the picture of the person B may be displayed in the second preset display area 302, that is, only the picture of the person A who is currently speaking is displayed in the first preset display area 301.

It should be noted that, in addition to the left and right split-screen manner as shown in FIG. 7B, the above split-screen manner may be set by the developer or the user as other manners according to actual needs, such as setting as the upper and lower split-screen manner, etc., which is not limited in this embodiment.

As can be known from the above description, in this embodiment, by determining the number of the persons who are speaking, and when the number is greater than or equal to 2, displaying the video images of all the persons who are speaking in the first preset display area on the terminal screen in a split-screen manner, it can be realized that a plurality of persons who are speaking and other persons who are not speaking can be displayed simultaneously in different preset display areas on the terminal screen, which can better highlight the person who is speaking, and can enhance the video information displaying effect to meet the needs of the user.

Figure 8:
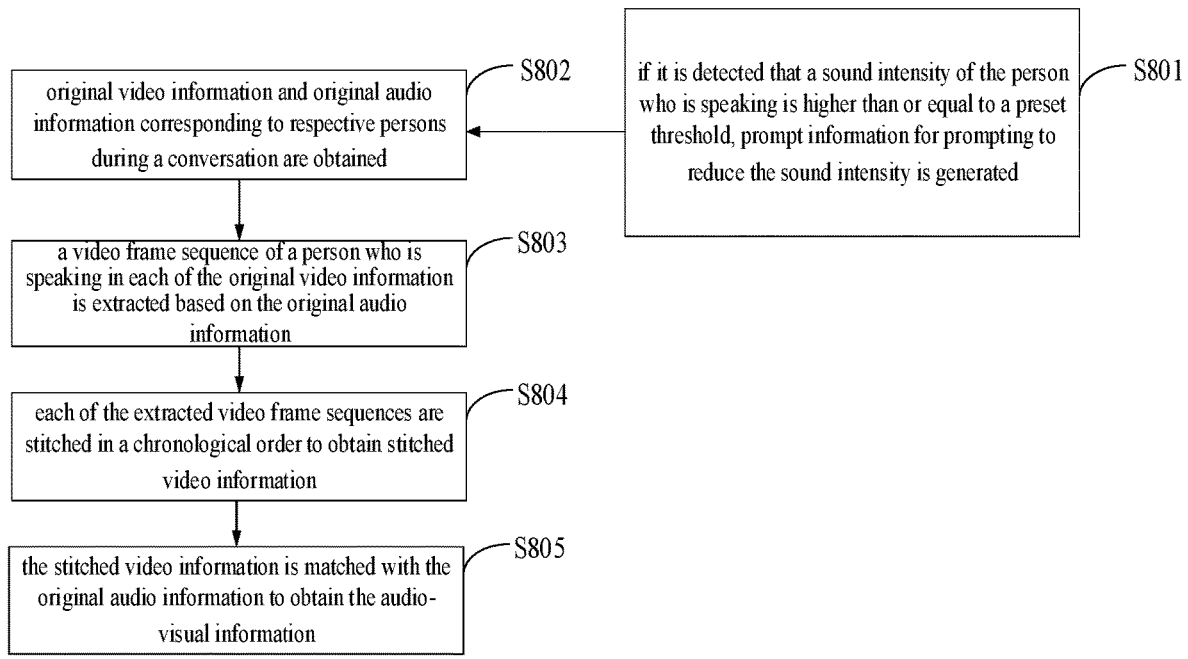
FIG. 8 is a flowchart of a method for obtaining audio-visual information according to a fifth exemplary embodiment of the present disclosure.

FIG. 8 is a flowchart of a method for obtaining audio-visual information according to a fifth exemplary embodiment of the present disclosure; this embodiment can be applied to a terminal device (such as a smartphone, a tablet, a desktop computer, and an identity information handheld terminal, etc.). As shown in FIG. 8, the method includes the following steps S801-S804.

In step S801, if it is detected that a sound intensity of the person who is speaking is higher than or equal to a preset threshold, prompt information for prompting to reduce the sound intensity is generated.

It can be understood that if a plurality of persons came to arguing during the conversation, for example, more than three people speak loudly at the same time, the original video information and the original audio information collected by the camera and the microphone may be too chaotic, which may affect accuracy of the subsequent processing of the video information. Therefore, in order to better collect the original video information and the original audio information corresponding to the respective persons in the conversation, the sound intensity of the person who is speaking can be detected. The unit of the sound intensity may be "decibel," which is not limited in this embodiment.

Further, when it is detected that the sound intensity of the person who is speaking is higher than or equal to the preset threshold, the prompt information for prompting to reduce the sound intensity may be generated, thereby avoiding the problem that the original video information and the original audio information which have been collected is too chaotic due to the dispute of the plurality of persons.

In an embodiment, the form and content of the prompt information may be set by the developer according to actual needs, which is not limited in this embodiment.

In step S802, original video information and original audio information corresponding to respective persons during a conversation are obtained.

In step S803, a video frame sequence of a person who is speaking in each of the original video information is extracted based on the original audio information.

In step S804, each of the extracted video frame sequences are stitched in a chronological order to obtain stitched video information.

In step S805, the stitched video information is matched with the original audio information to obtain the audio-visual information.

Herein, as for the related explanations and descriptions of steps S802-S805, reference may be made to the foregoing embodiments, and details are not described herein.

As can be known from the above description, in this embodiment, by generating prompt information for prompting to reduce the sound intensity when it is detected that the sound intensity of the person who is speaking is higher than or equal to the preset threshold, it can effectively avoid the problem that original video information and the original audio information which have been collected are too chaotic due to the dispute by multiple persons, so that the original video information and the original audio information which have been collected can be improved in clarity, thereby the accuracy of subsequent obtaining of the audio-visual information can be improved.

Figure 9:
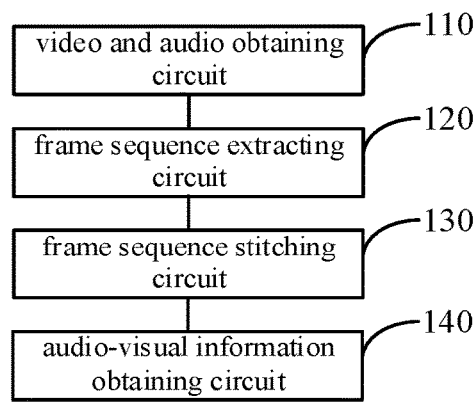
FIG. 9 is a block diagram of an audio-visual information obtaining apparatus according to an exemplary embodiment of the present disclosure.

FIG. 9 is a block diagram of an audio-visual information obtaining apparatus according to an exemplary embodiment of the present disclosure; as shown in FIG. 9, the apparatus includes: a video and audio obtaining circuit 110, a frame sequence extracting circuit 120, and a frame sequence stitching circuit 130, and an audio-visual information obtaining circuit 140, in which:

the video and audio obtaining circuit 110 is configured to obtain original video information and original audio information corresponding to respective persons during a conversation;

the frame sequence extracting circuit 120 is configured to extract, based on the original audio information, a video frame sequence of a person who is speaking in each of the original video information;

the frame sequence stitching circuit 130 is configured to stitch each of the extracted video frame sequences in a chronological order to obtain stitched video information;

the audio-visual information obtaining circuit 140 is configured to match the stitched video information with the original audio information to obtain the audio-visual information.

As can be known from the above description, in this embodiment, by obtaining the original video information and the original audio information corresponding to the respective persons during a conversation, and extracting a video frame sequence of a person who is speaking in each of the original video information based on the original audio information, each of the extracted video frame sequences can be stitched in a chronological order to obtain stitched video information, so as to match the stitched video information with the original audio information, and thus the audio-visual information is obtained. Since the video frame sequence of the person who is speaking in each of the original video information is extracted and then the respective video frame sequences are stitched in a chronological order, the obtained stitched video information can be made to include a video frame sequence corresponding to each person who is speaking, the automatic editing of the original video information during a multi-person conversation is realized, the requirement for the user's capability to obtain audio-visual information is lowered, and an intelligent level of audio-visual information acquisition is improved, thereby user experience is improved.

Figure 10:
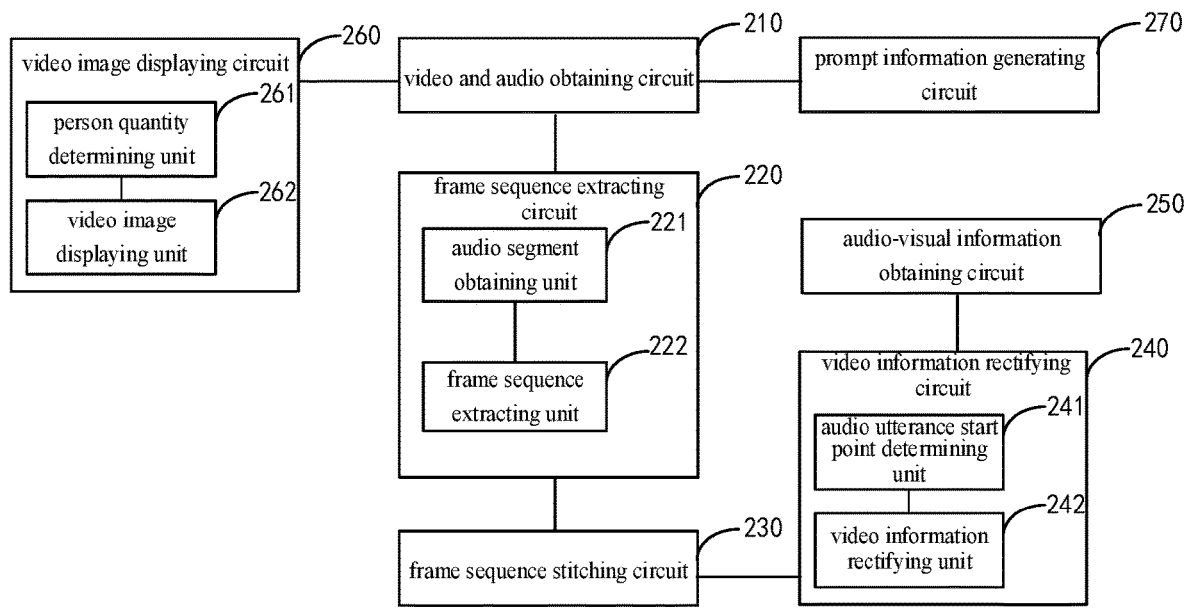
FIG. 10 is a block diagram of an audio-visual information obtaining apparatus according to still another exemplary embodiment of the present disclosure.

FIG. 10 is a block diagram of an audio-visual information obtaining apparatus according to still another exemplary embodiment of the present disclosure. Herein, functions of the video and audio obtaining circuit 210, the frame sequence extracting circuit 220, the frame sequence stitching circuit 230, and the audio-visual information obtaining circuit 250 are the same as those of the video and audio obtaining circuit 110, the frame sequence extracting circuit 120, the frame sequence stitching circuit 130, and the audio-visual information obtaining circuit 140 in the foregoing embodiment shown in FIG. 9, and no details are repeated herein. As shown in FIG. 10, the frame sequence extracting circuit 220 may include:

an audio segment obtaining unit 221 configured to determine an audio segment of the person who is speaking in the original audio information;

a frame sequence extracting unit 222 configured to extract a video frame sequence corresponding to the audio segment in each of the original video information.

In an embodiment, the audio segment obtaining unit 221 is further configured to:

perform voiceprint recognition on the original audio information to obtain a voiceprint feature of the person who is speaking;

screen, based on the voiceprint feature, the audio segment of the person who is speaking from the original audio information.

In an embodiment, the apparatus may further include a video information rectifying circuit 240; the video information rectifying circuit 240 may include:

an audio utterance start point determining unit 241 configured to determine an audio utterance start point of the person who is speaking in the audio segment;

a video information rectifying unit 242 configured to rectify, based on the audio utterance start point, the stitched video information.

In an embodiment, the audio-visual information obtaining circuit 210 is further configured to obtain a plurality of original video information collected simultaneously by a plurality of image collection devices during the conversation made by the respective persons.

In an embodiment, the apparatus further includes:

a video image displaying circuit 260 configured to, when the person is speaking, display a video image of the person who is speaking in a first preset display area on a terminal screen, and display a video image of other persons in a second preset area of the terminal screen, the other persons including persons other than the person who is speaking among the respective persons.

In an embodiment, the video image displaying circuit 260 includes:

a person quantity determining unit 261 configured to determine the number of the person who is speaking;

a video image displaying unit 262 configured to display, if the number is greater than or equal to 2, video images of all the persons who are speaking in a split-screen manner on the first preset display area of the terminal screen.

In an embodiment, the apparatus further includes:

a prompt information generating circuit 270 configured to generate prompt information for prompting to reduce the sound intensity if it is detected that a sound intensity of the person who is speaking is higher than or equal to a preset threshold.

Figure 11:
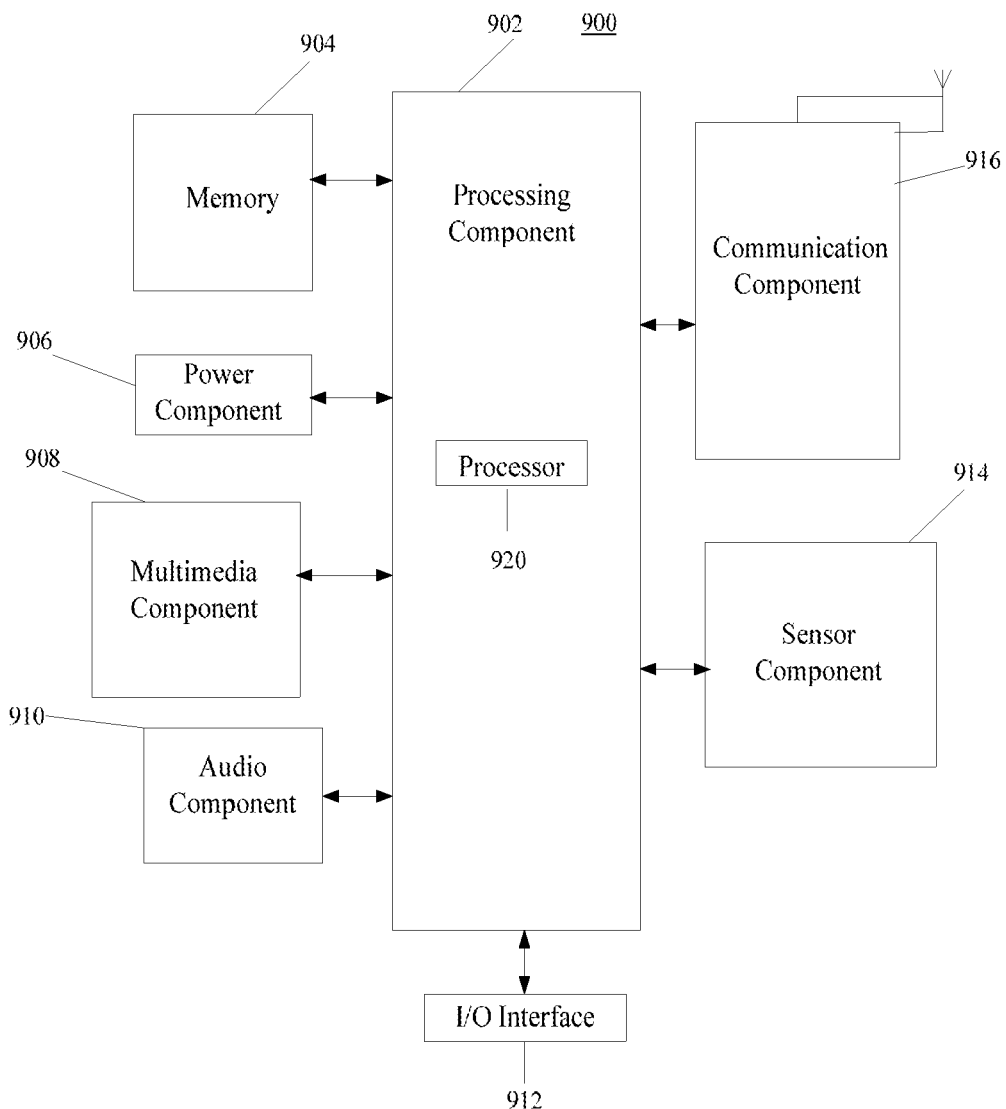
FIG. 11 is a block diagram of an electronic device according to an exemplary embodiment of the present disclosure.

FIG. 11 is a block diagram of an electronic device according to an exemplary embodiment of the present disclosure. For example, the device 900 may be a mobile phone, a computer, a digital broadcast terminal, a messaging device, a gaming console, a tablet, a medical device, fitness equipment, a personal digital assistant, and the like.

Referring to FIG. 11, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more circuits which facilitate the interaction between the processing component 902 and other components. For instance, the processing component 902 may include a multimedia circuit to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, videos, etc. The memory 904 can be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power for the device 900.

The various device components, circuits, modules, units, blocks, or portions may have modular configurations, or are composed of discrete components, but nonetheless may be referred to as "components," "modules" or "portions" in general. In other words, the "components," "circuits," "modules," "units," "blocks," or "portions" referred to herein may or may not be in modular forms.

The multimedia component 908 includes a screen providing an output interface between the device 900 and the user. In some embodiments, the screen may include a liquid crystal display (LCD) and a touch panel (TP). In some embodiments, an organic light-emitting diode (OLED) display or other types of displays can be adopted.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive external multimedia data while the device 900 is in an operation mode, such as a photographing mode or a video mode. Each of the front camera and the rear camera may be a fixed optical lens system or have focal length and optical zoom capability.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface circuits, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, and the sensor component 914 may also detect a change in position of the device 900 or a component of the device 900, the presence or absence of user contact with the device 900, orientation or acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate, wired or wireless communication between the device 900 and other devices. The device 900 can access a wireless network based on a communication standard, such as Wi-Fi, 2G, 3G, 4G, or 5G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) circuit to facilitate short-range communications. For example, the NFC circuit may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for obtaining the audio-visual information.

In exemplary embodiments, there is also provided a non-transitory computer-readable storage medium including instructions, such as the memory 904 including instructions executable by the processor 920 in the device 900 to perform the above-described methods for obtaining audio-visual information. For example, the non-transitory computer-readable storage medium may be a ROM, a RAM, a CD-ROM, a magnetic tape, a floppy disc, an optical data storage device, and the like.

Various embodiments of the present disclosure can have one or more of the following advantages.

By obtaining the original video information and the original audio information corresponding to the respective persons during a conversation, and extracting a video frame sequence of a person who is speaking in each of the original video information based on the original audio information, each of the extracted video frame sequences can be stitched in a chronological order to obtain stitched video information. Since the video frame sequence of the person who is speaking in each of the original video information is extracted, and then the respective video frame sequences are stitched in a chronological order, the obtained stitched video information can be made to include a video frame sequence corresponding to each person who is speaking, the automatic editing of the original video information during a multi-person conversation can be realized, the requirement for the user's capability to obtain audio-visual information is lowered, and intelligent level of audio-visual information acquisition is improved, thereby user experience can be improved.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for obtaining audio-visual information, the method comprising:
   obtaining original video information and original audio information corresponding to respective speakers during a conversation;
   extracting a video frame sequence of a speaker who is speaking in each of the original video information based on the original audio information;
   stitching each of the extracted video frame sequences in a chronological order to obtain stitched video information; and
   matching the stitched video information with the original audio information to obtain the audio-visual information.

2. The method according to claim 1, wherein said extracting a video frame sequence of a speaker who is speaking in each of the original video information based on the original audio information comprises:
   determining an audio segment of the speaker who is speaking in the original audio information; and
   extracting a video frame sequence corresponding to the audio segment in each of the original video information.

3. The method according to claim 2, wherein said determining an audio segment of the speaker who is speaking in the original audio information comprises:
   performing voiceprint recognition on the original audio information to obtain a voiceprint feature of the speaker who is speaking; and
   screening, based on the voiceprint feature, the audio segment of the speaker who is speaking from the original audio information.

4. The method according to claim 2, wherein the method further comprises:
   determining an audio utterance start point of the speaker who is speaking in the audio segment; and
   rectifying, based on the audio utterance start point, the stitched video information.

5. The method according to claim 1, wherein said obtaining original video information corresponding to respective speakers during a conversation comprises:
   obtaining a plurality of original video information collected simultaneously by a plurality of image collection devices during the conversation made by the respective speakers.

6. The method according to claim 1, wherein the method further comprises:
   when the speaker is speaking, displaying a video image of the speaker who is speaking in a first preset display area on a terminal screen, and displaying a video image of other speakers in a second preset area on the terminal screen, said other speakers including speakers other than the speaker who is speaking among the respective speakers.

7. The method according to claim 6, wherein said displaying a video image of the speaker who is speaking in a first preset display area on a terminal screen comprises:

determining the number of the speaker who is speaking; and if the number is greater than or equal to 2, displaying video images of all the speakers who are speaking in a split-screen manner in the first preset display area on the terminal screen.

8. The method according to claim 1, wherein the method further comprises:

if it is detected that a sound intensity of the speaker who is speaking is higher than or equal to a preset threshold, generating prompt information for prompting to reduce the sound intensity.

9. An apparatus for obtaining audio-visual information, the apparatus comprising:

a video and audio obtaining circuit configured to obtain original video information and original audio information corresponding to respective speakers during a conversation;

a frame sequence extracting circuit configured to extract, based on the original audio information, a video frame sequence of a speaker who is speaking in each of the original video information;

a frame sequence stitching circuit configured to stitch each of the extracted video frame sequences in a chronological order to obtain stitched video information; and an audio-visual information obtaining circuit configured to match the stitched video information with the original audio information to obtain the audio-visual information.

10. The apparatus according to claim 9, wherein the frame sequence extracting circuit comprises:

an audio segment obtaining unit configured to determine an audio segment of the speaker who is speaking in the original audio information; and a frame sequence extracting unit configured to extract a video frame sequence corresponding to the audio segment in each of the original video information.

11. The apparatus according to claim 10, wherein the audio segment obtaining unit is further configured to:

perform voiceprint recognition on the original audio information to obtain a voiceprint feature of the speaker who is speaking; and screen, based on the voiceprint feature, the audio segment of the speaker who is speaking from the original audio information.

12. The apparatus according to claim 10, wherein the apparatus further comprises a video information rectifying circuit; the video information rectifying circuit comprises:

an audio utterance start point determining unit configured to determine an audio utterance start point of the speaker who is speaking in the audio segment; and a video information rectifying unit configured to rectify, based on the audio utterance start point, the stitched video information.

13. The apparatus according to claim 9, wherein the video and audio obtaining circuit is further configured to obtain a plurality of original video information collected simultaneously by a plurality of image collection devices during the conversation made by the respective speakers.

14. The apparatus according to claim 9, wherein the apparatus further comprises:

a video image displaying circuit configured to display, when the speaker is speaking, a video image of the speaker who is speaking in a first preset display area on a terminal screen, and display a video image of other speakers in a second preset area on the terminal screen, said other speakers including speakers other than the speaker who is speaking among the respective speakers.

15. The apparatus according to claim 14, wherein the video image displaying circuit comprises:

a speaker quantity determining unit configured to determine the number of the speakers who are speaking; and a video image displaying unit configured to display, if the number is greater than or equal to 2, video images of all the speakers who are speaking in a split-screen manner in the first preset display area on the terminal screen.

16. The apparatus according to claim 9, wherein the apparatus further comprises:

a prompt information generating circuit configured to generate prompt information for prompting to reduce the sound intensity if it is detected that a sound intensity of the speaker who is speaking is higher than or equal to a preset threshold.

17. An audio-visual information obtaining device, comprising: a memory, a processor, and a computer program stored on the memory and operable on the processor, wherein the following is implemented when the processor executes the program:

obtaining original video information and original audio information corresponding to respective speakers during a conversation;

extracting, based on the original audio information, a video frame sequence of a speaker who is speaking in each of the original video information;

stitching each of the extracted video frame sequences in a chronological order to obtain stitched video information; and matching the stitched video information with the original audio information to obtain the audio-visual information.

18. A non-transitory computer-readable storage medium on which computer-executable instructions are stored and for execution by a processing circuit to implement the method according to claim 1.

19. A mobile phone configured to implement the method according to claim 1, wherein the mobile phone comprises one or more cameras configured to capture the original video information and original audio information.

20. The mobile phone of claim 19, wherein the one or more cameras comprise front and rear cameras on the same mobile phone, and wherein the mobile phone is configured to automatically place each of the extracted video frame sequences the chronological to obtain stitched video information including a video frame sequence corresponding to each speaker who is speaking, without post editing.

* * * * *